United States Patent [19]

Rightmyre

[11] Patent Number: 4,575,228

[45] Date of Patent: Mar. 11, 1986

[54] ILLUMINATION APPARATUS FOR COPYING MACHINES

[75] Inventor: Bruce M. Rightmyre, Carol Stream, Ill.

[73] Assignee: Petro-Fax, Inc., Casper, Wyo.

[21] Appl. No.: 550,970

[22] Filed: Nov. 14, 1983

[51] Int. Cl.⁴ ............................................. G03B 27/72
[52] U.S. Cl. ..................................... 355/71; 350/315; 362/293
[58] Field of Search ........................ 355/71, 67, 70, 83, 355/37, 35, 68; 350/311, 314, 315; 362/293

[56] References Cited

U.S. PATENT DOCUMENTS

| | | | |
|---|---|---|---|
| 2,301,419 | 11/1942 | Lew | 350/314 |
| 2,761,959 | 9/1956 | Kunins | 362/293 X |
| 3,398,669 | 8/1968 | Hicks, Jr. | 95/73 |
| 3,914,049 | 10/1975 | Basu et al. | 355/68 |
| 3,947,106 | 3/1976 | Hamaguchi et al. | 355/1 |
| 3,977,777 | 8/1976 | Tanaka et al. | 355/1 |
| 4,082,443 | 4/1978 | Draugelis et al. | 355/4 |
| 4,124,295 | 11/1978 | Gardiner | 355/68 |
| 4,125,315 | 11/1978 | Altman et al. | 350/96.10 |
| 4,171,905 | 10/1979 | Boschet | 355/71 |
| 4,248,517 | 2/1981 | Nishikawa | 355/1 |
| 4,300,831 | 11/1981 | Isago | 355/67 |

Primary Examiner—L. T. Hix
Assistant Examiner—Brian W. Brown
Attorney, Agent, or Firm—Neuman, Williams, Anderson & Olson

[57] ABSTRACT

The disclosure describes an illumination apparatus for a xeroxgraphic copy machine which produces a copy of an original document. The illumination apparatus comprises a lamp, a shield which surrounds the lamp and has at least one aperture enabling the lamp to illuminate the original document, and at least one filter disposed between the lamp and the document for selectively controlling the intensity or wave length of the light radiated to the document. Preferably, the illumination apparatus comprises at least two aperatures in the shield and at least two transmissively dissimilar filters, and a control apparatus, such as a control knob, belt and pulley, for selectively disposing the filters between the lamp and the original document.

6 Claims, 5 Drawing Figures

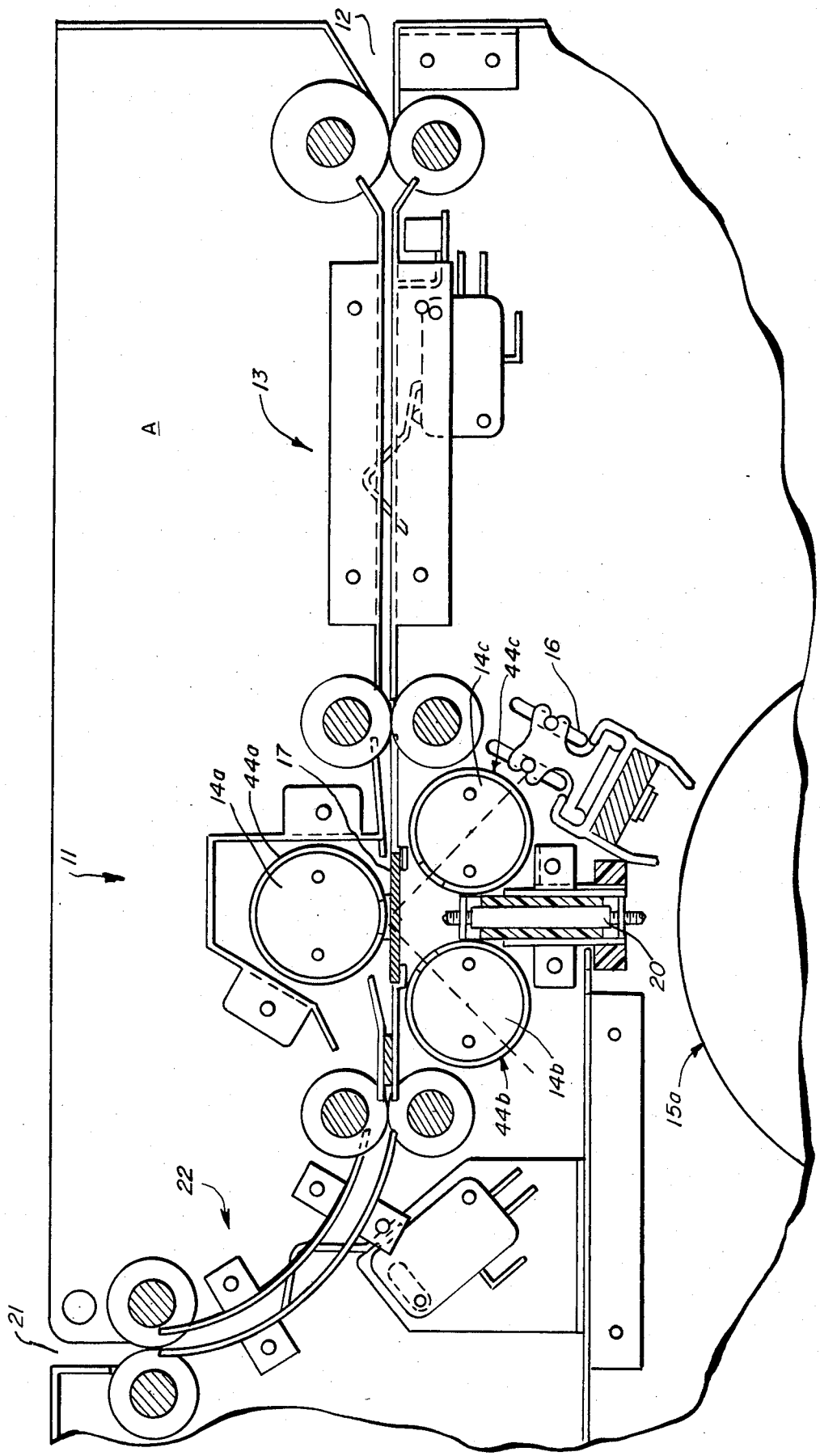

ILLUMINATION APPARATUS FOR COPYING MACHINES

BACKGROUND OF THE INVENTION

1. Field of the Invention

This invention relates to a new illumination apparatus for a copying machine. More particularly, the invention relates to a new and novel apparatus for controlling the intensity, i.e., the "darkness" or "lightness", of the copy produced by the machine, as well as the wavelength of the light radiated to the photoconductor element of the copying machine. The invention finds particular utility in applications where the copying machine experiences rough, continuous or near continuous service in a variety of environments, as, for example, a copying machine used at an on-site location to copy long, continuous original documents having variable optical permeability characteristics, such as well logs or seismographic tapes.

2. Description Of The Prior Art

A copying machine typically requires a high power lamp to illuminate the original document being copied. A fundamental problem associated with copying long, continuous documents, e.g., well logs, seismographic tapes, or cardiopulmonary records, is how to avoid the heat buildup that accompanies continuous operation of the high power lamp. Moreover, even in intermittent service, a typical incandescent lamp must be positioned far enough away from the original document to prevent scorching or igniting the original due to the heat generated by the lamp. Since the intensity of the light reflected on or through the original document is inversely proportional to the square of its distance from the light source, the spacing requirement of the incandescent lamp means less light will reach the document unless the power of the lamp is increased accordingly. But as the power of the lamp is increased, so does the amount of heat it generates.

One solution suggested by the art is the use of a fluorescent lamp. For a given candlepower, fluorescent lamps generate much less heat than incandescent lamps. Thus, not only can a fluorescent lamp be used continuously without undue heat buildup, but it can be used in close proximity to the original document without damaging the document, which results in more efficient use of the lamp and a more compact design for the copying machine.

Fluorescent lamps, however, present their own peculiar problems, especially where it is desirable to provide a copying machine with the capability of making copies of different degrees of darkness and, thus, the capability of making copies of original documents which are different in their optical permeability. For example, fluorescent tubes, the specific form of fluorescent lamps typically utilized in copying machines, show a marked decrease in light intensity at their ends. To remedy this problem, Nishikawa, U.S. Pat. No. 4,248,517, taught the use of a fluorescent tube mask having nonuniform, circumferential openings for producing a uniform light distribution.

Another distinct problem associated with fluorescent lamps is their inherent inflexibility. The intensity of the light produced by the lamp in a copying machine largely determines the "lightness" or "darkness" of the copy produced, so a range of intensities is desirable. The light intensity of a halogen lamp or an incandescent lamp can be changed simply by varying the voltage input to the lamp. Varying the voltage input to a fluorescent lamp, however, only minimally affects the light intensity.

Moreover, the wavelength of the light produced by a fluorescent lamp is similarly unaffected by varying the voltage input to the lamp. Since the spectral response curve of the photoconductor element of a copying machine varies depending on the type of photoconductor material used to coat the photoconductor element, and since even for a given photoconductor material the material will, in general, function optimally only within a given range of wavelengths, it is accordingly advantageous to be able to tailor the wavelength of the light from the fluorescent lamp to the operating characteristics of the photoconductor material. Due to continuing advances in photoconductor technology, it is also possible that existing photocopying machines may be upgraded by simply changing the photoconductor element of the machine. It is therefore particularly advantageous to provide the copy machine with an illumination apparatus that can readily be retrofitted or adapted to operate compatibly with various photoconductor materials.

SUMMARY OF THE INVENTION

The general object of the invention is to provide an improved illumination apparatus for copying machines. Further objects include providing an illumination apparatus that is adaptable to a wide variety of lamps and copying machines; providing an illumination apparatus that increases the flexibility of fluorescent lamps; and providing an illumination apparatus that is mechanically reliable and effective.

Accordingly, the present invention encompasses an illumination apparatus for a machine which produces a copy of an original document. The illumination apparatus comprises a lamp and a shield that surround the lamp and has at least one aperture for illuminating the original document. The illumination apparatus further comprises at least two light filters with different filtering characteristics and a means for alternatively disposing the filters between the lamp and the original document.

Further objects, aspects and advantages of the invention will become apparent upon studying the following detailed description and accompanying illustrations of two preferred embodiments of the invention and the following claims to the invention.

BRIEF DESCRIPTION OF THE DRAWINGS

FIG. 5 is a sectional side elevation view of another embodiment of the present invention in association with a portion of a xerographic copy machine.

Although these figures adequately illustrate the invention, they have not necessarily been drawn to scale. In addition, certain elements may have been illustrated by graphic symbols, phantom lines, diagrammatic representations, or fragmentary views, or may have been omitted entirely if they are not necessary for a proper understanding of the invention or if they render more important details difficult to perceive.

DETAILED DESCRIPTION OF THE DRAWINGS INCLUDING PREFERRED EMBODIMENTS

Figure 1:
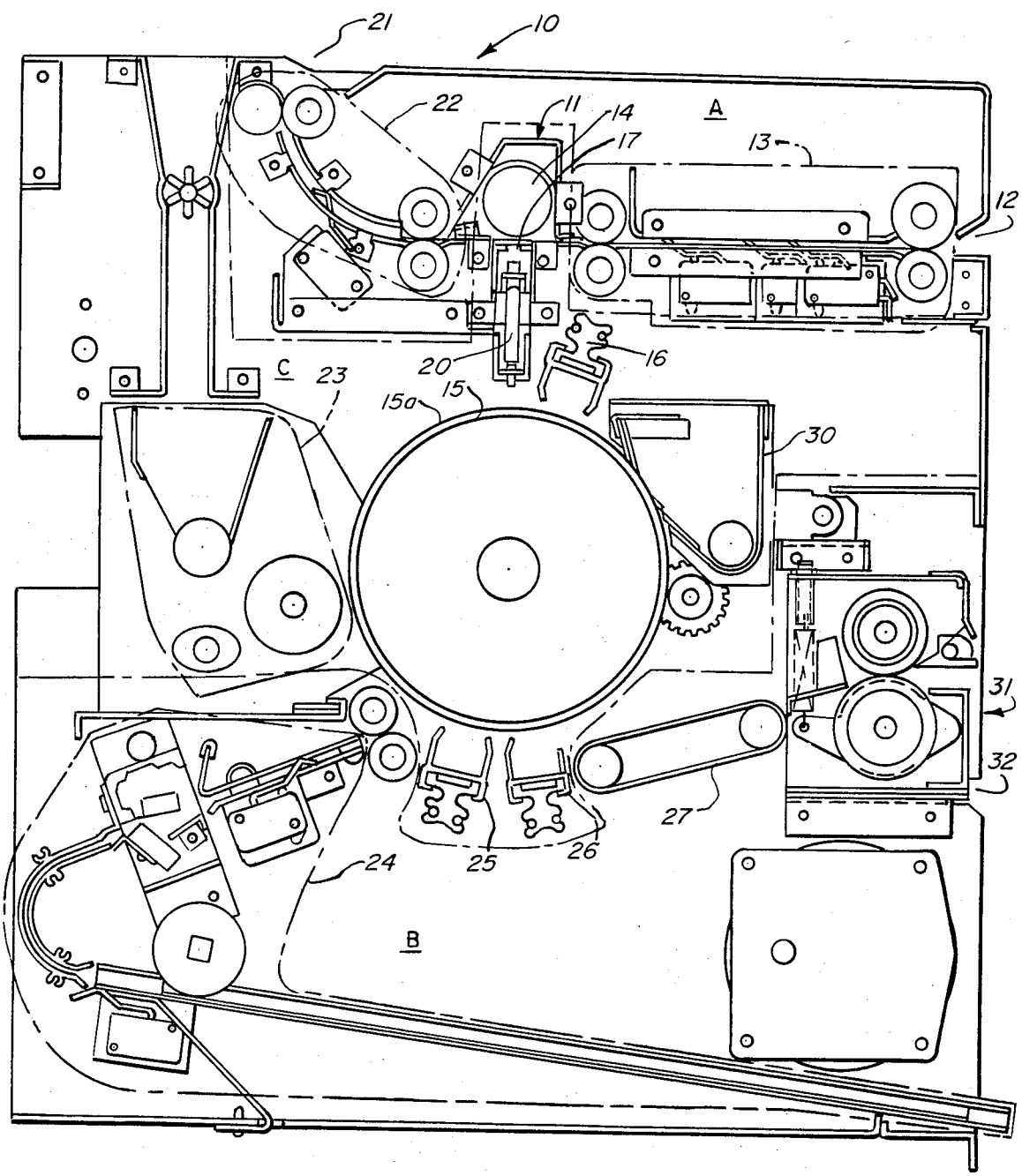
FIG. 1 is a sectional side elevation view showing the general location of an embodiment of the illumination apparatus of the present invention in a xerographic copy machine.

FIG. 1 shows a xerographic copying machine 10 which includes an illumination apparatus 11 constructed and incorporated according to the invention. Since the illumination apparatus 11 is an integral part of the copying machine 10, the essential features of construction and operation of the copying machine 10 will be presented before the illumination apparatus 11 is described in detail.

The copy machine 10 of FIG. 1 is designed to copy transmissive original documents. Generally, it comprises an original feed unit A that feeds the original document (not shown) through the machine 10 and insulates the original document from the environment outside the machine 10, a copy feed unit B that feeds a copy paper (not shown) through the machine 10, and a reproduction unit C that reproduces on the copy paper the matter appearing on the original document.

Operationally, the copying machine 10 entails an involved sequence of events. Once the original document is placed in an entry slot 12, an original feed roller assembly 13 begins feeding the original document towards the exposure lamp 14 of the illumination apparatus 11 and a photoconductor drum 15 begins rotating counterclockwise past a charge corona assembly 16. The surface 15a of the photoconductor drum 15 is coated with a suitable photoconducting material, e.g., selenium, selenium arsenic or selenium alloys, arsenic triselenide, or cadmium sulfide, and is charged by the charge corona assembly 16 as the drum 15 rotates. For selenium-type materials, the charge corona assembly 16 applies a positive charge to the drum's surface 15a, and for cadmium sulfide, the charge corona assembly 16 applies a negative charge.

As the original feed roller assembly 13 feeds the original document between the exposure lamp 14 and the exposure window 17, the lamp 14 illuminates the document, projecting light through the transmissive portions of the document, through the exposure window 17, and onto the charged photoconducting surface 15a of the rotating photoconductor drum 15 via a lens arrangement 20. In the area on the charged photoconducting surface 15a where light impinges, i.e., the area corresponding to a transmissive portion of the document, the charge is neutralized to an extent depending on the intensity or wavelength of the impinging light; in the area where no light impinges, i.e., the area corresponding to an opaque portion of the document, the charge remains intact. Thus, a latent image of the matter appearing on the original document is cast onto the surface 15a of the rotating drum 15 as the document is fed past the exposure lamp 14. After passing the exposure lamp 14, the original document is discharged from the machine 10 through the discharge slot 21 by the original discharge roller assembly 22.

As the original document is being discharged, the photoconductor drum 15 continues rotating counterclockwise past a magnetic brush developer assembly 23 which dispenses toner particles onto the drum's surface 15a. The toner particles have a charge opposite that placed on the surface 15a of the drum 15 by the charge corona assembly 16, so the particles are electrostatically attracted to and adhere to the charged areas of the latent image on the drum's surface 15a, the local surface density of the toner particles depending on the local charge density on the drum's surface 15a.

Continuing to rotate counterclockwise, the photoconductor drum 15 next contacts a copy paper which is fed onto the drum's surface 15a by the copy paper feed roller assembly 24. The copy paper electrostatically adheres to the drum's surface 15a. It next reaches the transfer corona assembly 25. As the drum 15 rotates past the transfer corona assembly 25, it applies a charge to the copy paper of slightly greater magnitude than that on the drum's surface 15a. This causes the toner particles to release from the surface 15a of the drum 15 and adhere to the copy paper. The copy paper is then released from the drum's surface 15a by a stripper corona assembly 26 onto a belt conveyor 27. Continuing counterclockwise, the drum 15 next encounters a cleaning blade assembly 30 which removes any residual toner particles on the surface 15a and prepares the surface 15a to again be charged by the charge corona assembly 16 during the next copy cycle.

As the photoconductor drum 15 is being cleaned, the copy paper, which now retains the toner particles in the image of the matter appearing on the original document, is fed by the belt conveyor 27 to a heated roller system 31. The heated roller system 31 melts and fuses the toner particles onto the copy paper and presents a finished copy at the output slot 32.

Figure 2:
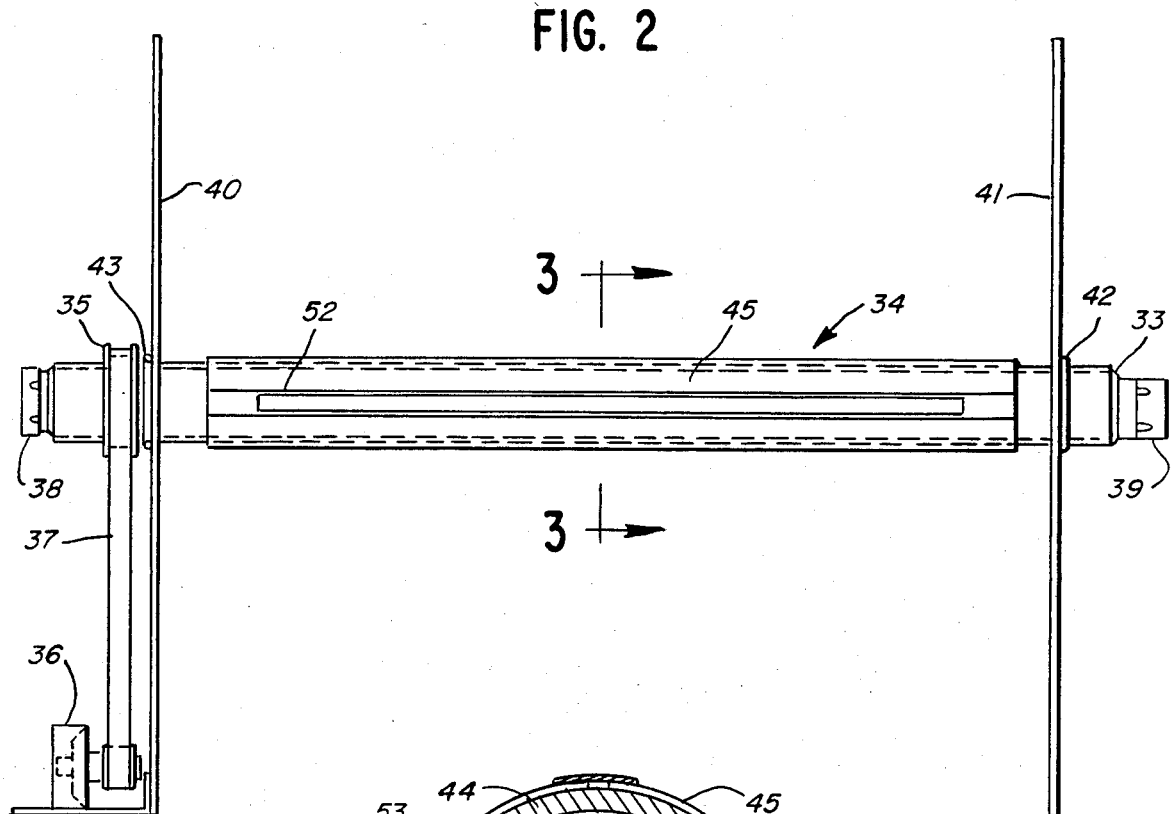
FIG. 2 is a plan view of an embodiment of the illumination apparatus of the present invention.
Figure 3:
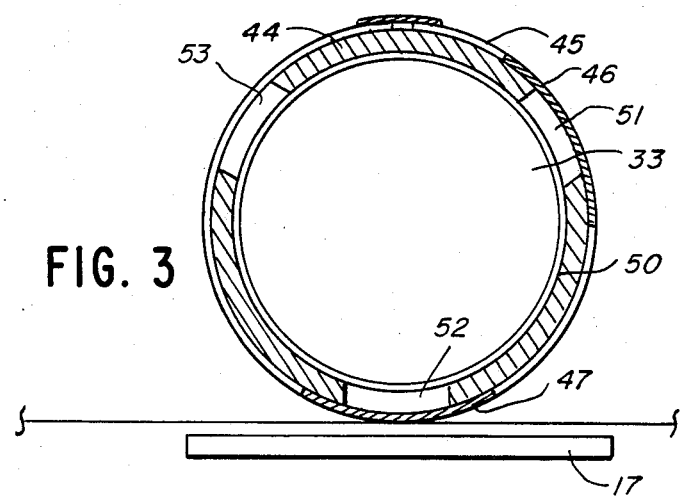
FIG. 3 is a sectional view of the exposure lamp of the illumination apparatus of FIG. 2.

FIGS. 2 and 3 show the illumination apparatus 11 of one embodiment of the invention in greater detail. It generally comprises an exposure lamp 14, in this embodiment a fluorescent tube 33, surrounded by a tubular assembly 34, a pulley 35 attached to the tubular assembly 34, and a positioning knob 36 interconnected to the pulley 35 by a belt 37. The fluorescent tube 33 is disposed slightly above and parallel to the exposure window 17 and normal to the original document feed 13. The fluorescent tube 33 is stationarily mounted between two sockets 38 and 39. The tubular assembly 34 is mounted for rotation about the fluorescent tube 33 to front and rear frame sections 40 and 41 by two retainers 42 and 43.

The tubular assembly 34 includes a shield 44, a filter carrier 45, and two dissimilarly transmissive filters 46 and 47. The shield 44, which preferably has a reflective inside surface, surrounds and extends axially virtually the entire length of the fluorescent tube 33. A small gap 50 separates them to allow thermal expansion during operation. Three apertures 51, 52 and 53, spaced approximately 120° apart, extend axially much of the length of the shield 44 between the frame sections 40 and 41.

Figure 4:
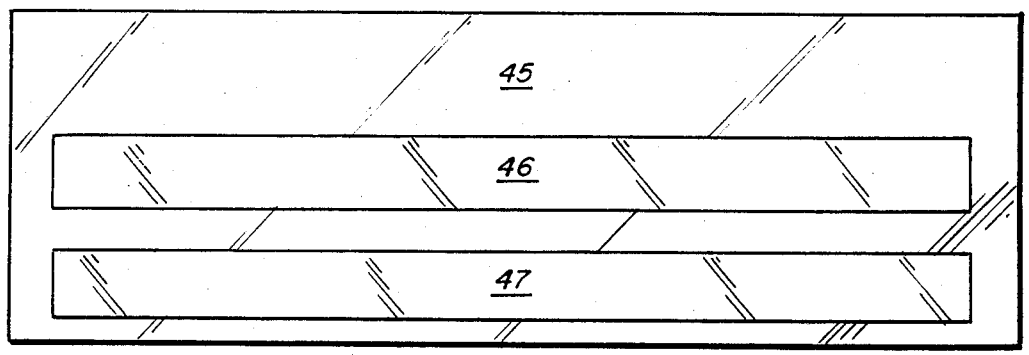
FIG. 4 is a plan view of the filter carrier of the exposure lamp of FIG. 3.

FIG. 4 shows the filter carrier 45 with the two filters 46 and 47 attached. The filter carrier 45 is wrapped around and attached to the shield 44, e.g., by tape, so that the filters 46 and 47 are between the filter carrier 45 and the shield 44 and so that each filter 46 and 47 covers one of two apertures 51 and 52. The third aperture 53 is covered only by the filter carrier 45, which in this embodiment is preferably clear. Placing the filters 46 and 47 between the filter carrier 45 and the shield 44 prevents them from being damaged by the original document as it is fed through the machine 10.

The illumination apparatus 11 of the invention enables certain characteristics, e.g., intensity or wavelength, of the light produced by the fluorescent tube 33 to be adjusted. For example, if a "light" copy of an original document is desired, the positioning knob 36 is rotated, which in turn rotates the tubular assembly 34 about the fluorescent lamp 33, until the aperture 53, which is covered only by the clear filter carrier 45, i.e., a "clear" filter, is at the six o'clock position. The copying sequence is then initiated. Since the filter carrier 45 is clear, the light shining on the document, and, therefore, projecting through the document and onto the photoconducting surface 15a of the photoconductor drum 15, is at its maximum intensity. Consequently, the maximum amount of charge will be neutralized, which will result in a minimum surface density of the toner particles and a "light" copy.

On the other hand, if a "dark" copy of an original document is desired, the positioning knob 36 is rotated until the aperture 52, which is covered by a darker or less transmissive filter 47, i.e., a filter which decreases the intensity of light uniformly across the spectrum, is at the six o'clock position, and the copying sequence is again initiated. The darker filter 47 reduces the intensity of the light shining on the original document and, therefore, projecting onto the drum's photoconducting surface 15a, which, in turn, reduces the amount of charge that is neutralized and results in an increased surface density of the toner particles and a "darker" copy.

Similarly, if light of a particular wavelength, e.g., yellow light, were required, the positioning knob 36 is rotated until the aperture 51, which is covered by the desired monochromatic filter 46, is at the six o'clock position, and the copying sequence is then initiated.

By enabling adjustment of the intensity and wavelength (i.e., color) of the light produced by the fluorescent tube 33, the illumination apparatus 11 of the invention greatly increases its flexibility and, therefore, its usefulness. A wide variety of filters may be used to produce an entire spectrum of light intensities and colors. In addition to increasing the flexibility of the fluorescent tube 33, the illumination apparatus 11 of the invention, by varying the intensity and color mechanically instead of electrically, also increases the life span of the fluorescent tube 33.

FIG. 5 shows part of a xerographic copying machine 10 designed to copy opaque, as well as transmissive, original documents. The illumination apparatus 11 of this embodiment of the invention comprises three exposure lamps 14a, 14b and 14c. One exposure lamp 14a operates as previously described to project light through a transmissive original document and cast a latent image onto the charged photoconducting surface 15a of the photoconductor drum 15. For copying opaque original documents, two other exposure lamps 14b and 14c illuminate one side of the document, emitting light which reflects from the reflective portions of that side onto the charged photoconducting surface 15a of the drum 15, again, via the lens arrangement 20. The impinging reflected light then forms a latent image on the drum's surface 15a in the same manner as impinging transmitted light would have.

All three exposure lamps 14a, 14b and 14c of this embodiment of the invention may be identical to the exposure lamp 14 of the first described embodiment, except that two of the exposure lamps 14b and 14c are located under and parallel to the exposure window 17 and normal to the original document feed 13 and except that the two lower shields 44b and 44c preferably have highly reflective outer surfaces to most efficiently utilize the available light. The illumination apparatus 11 of this embodiment also has a similar positioning knob/belt/pulley arrangement and is operated in a similar manner.

While two particular embodiments of the invention have been described above, the invention is not so limited. Alternative embodiments and modifications which would still be encompassed by the invention may be made by those skilled in the art, particularly in light of the foregoing teachings. For example, while the embodiments are described as having a clear filter and two additional light filters with different filtering characteristics, apparatus having more than two such additional filters, or having no clear filter, or having only one non-clear filter, are also within the scope of the present invention. Therefore, the following claims are intended to cover any alternative embodiments, modifications or equivalents which may be included within the spirit and scope of the invention as claimed.

Having described the invention, what is claimed is:

1. An improved xerographic copy machine for producing a copy of an original document and in which the latent image of matter appearing on the original document is cast onto the charged photoconducting surface of a rotating photoconductor drum via a lens arrangement, wherein the improvement comprises: an elongate light source disposed in the copy machine for illuminating the original document passing through said copy machine; filter means disposed adjacent said light source and between said light source and said original document for selectively controlling the intensity or wavelength of the light from said light source which illuminates said original document, said filter means including a plurality of transmissively dissimilar filters, said filter means controlling the intensity or wavelength uniformly along the length of said light source; and control means for alternatively individually disposing said filters between said light source and said document.

2. The improvement of claim 1, further comprising a cylindrical, substantially opaque shield generally surrounding said light source, said shield having a plurality of longitudinal apertures spaced apart along its circumference, said apertures enabling said light source to illuminate said original document.

3. The improvement of claim 1 or 2 wherein said light source includes a fluorescent tube disposed parallel to said document.

4. The improvement of claim 2 wherein each of said filters covers one of said apertures.

5. The improvement of claim 2 or 4 wherein said control means include rotation means for selectively rotating said shield.

6. The improvement of claim 5 wherein said rotation means include a knob mounted for rotation to said machine, a pulley attached to said shield, and a belt operatively coupling said knob and said pulley.

* * * * *